United States Patent [19]
Fukuda et al.

[11] Patent Number: 4,717,738
[45] Date of Patent: Jan. 5, 1988

[54] POLYURETHANE BASED ON HYDROXYL-CONTAINING POLYMER POLYOL AND PROCESS FOR MAKING THE SAME

[75] Inventors: Masao Fukuda, Uji; Koji Kumata, Yawata, both of Japan

[73] Assignee: Sanyo Chemical Industries, Ltd., Kyoto, Japan

[21] Appl. No.: 810,264

[22] Filed: Dec. 18, 1985

[30] Foreign Application Priority Data

Jan. 22, 1985 [JP] Japan ................................. 60-10545
Jul. 3, 1985 [JP] Japan ................................. 60-147304
Jul. 4, 1985 [JP] Japan ................................. 60-147955

[51] Int. Cl.$^4$ ............................................. C08G 18/14
[52] U.S. Cl. .................................... 521/137; 521/173; 521/176; 525/327.2; 525/328.8; 525/329.2; 525/329.5; 525/330.5; 525/460; 526/209; 526/210; 526/211; 526/213; 528/75; 528/76
[58] Field of Search ...................... 521/137, 173, 176; 525/327.2, 328.8, 329.2, 329.5, 330.5, 460; 526/209, 210, 211, 213, 216; 528/75, 76

[56] References Cited

U.S. PATENT DOCUMENTS 3,383,351 5/1968 Stamberger .................... 260/33.2
4,542,165 9/1985 Kumata et al. .................... 521/124

FOREIGN PATENT DOCUMENTS 1129284 10/1968 United Kingdom .

OTHER PUBLICATIONS

Kuryla et al., Journal of Cellular Plastics, Mar., 1966, pp. 84–96, "Polymer/Polyols, a New Class of Polyurethane Intermediates".

Primary Examiner—Maurice J. Welsh
Attorney, Agent, or Firm—Oblon, Fisher, Spivak, McClelland & Maier

[57] ABSTRACT

Polyurethane resins having high rigidity and improved physical properties, such as mechanical strengths and heat resistance are obtained by reacting a polyisocyanate with a polyol component comprising a pendant hydroxyl-containing polymer polyol, of high polymer content, derived from a polyol and a mixture comprising a hydroxyl-containing monomer and an unsaturated nitrile, or a combination of said polymer polyol with an epoxy-containing polymer polyol.

41 Claims, No Drawings

POLYURETHANE BASED ON HYDROXYL-CONTAINING POLYMER POLYOL AND PROCESS FOR MAKING THE SAME

BACKGROUND OF THE INVENTION

1. Field of the Invention

This invention relates to polyurethanes. More particularly, it relates to polyurethanes, having improved physical properties, derived from a polymer polyol, and to a process for producing the same.

2. Description of the Prior Art

It is well known that polyurethane foams and elastomers having load-bearing properties can be obtained from polymer polyols, which are prepared by polymerization of one or more ethylenically unsaturated monomers (such as acrylonitrile and combination thereof with styrene) in situ in polyols and have polymer content of 20-30% by weight. A few documents disclose pendant hydroxyl-containing polymer polyols, but polyurethanes prepared therefrom have physical properties not so good as those produced from polymer polyol of acrylonitrile alone.

SUMMARY OF THE INVENTION

It is an object of the present invention to provide a polyurethane having high rigidity and improved physical properties.

It is another object of this invention to provide a polyurethane having high improved heat resistance, impact resistance and other mechanical strengths.

It is still another object of the invention to provide a process for producing a high-rigidity polyurethane, particularly suitable for Reaction Injection Molding (hereinafter referred to as RIM) method.

It is yet another object of the invention to provide a polymer polyol which provides a polyurethane having high rigidity and improved physical properties.

Briefly, these and other objects of the present invention as hereinafter will become more readily apparent have been attained broadly by a process for producing a polyurethane, which comprises reacting at least one organic polyisocyanate with a polyol component, at least a part of which is a pendant hydroxyl radical-containing polymer polyol, which is derived from a polyol and a monomer mixture comprising a hydroxyl-containing monomer and an unsaturated nitrile and contains a polymer content of at least 30% by weight.

DETAILED DESCRIPTION OF THE PREFERRED EMBODIMENTS

The pendant hydroxyl radical-containing polymer polyol, used for producing polyurethanes according to the invention, can be derived from at least one polyol and monomers comprising (a) at least one hydroxyl radical-containing monomer, selected from the group consisting of
  (1) esters of an ethylenically unsaturated carboxylic acid with a glycol,
  (2) polymerizable unsaturated aliphatic alcohols,
  (3) furfuryl alcohol, and
  (4) N-alkylol acrylamides; and
(b) at least one unsaturated nitrile.

Suitable examples of said esters (1) include:

(1-i) esters of one or more ethylenically unsaturated mono- or poly-carboxylic acids, such as (meth)acrylic (acrylic and methacrylic; similar expressions are used hereinafter), crotonic, maleic, fumaric, itaconic, citraconic, mesaconic, methylenemalonic, aconitic, cinnamic and vinyl benzoic acids, with one or more glycols, such as $C_2$-$C_6$ alkylene glycols [ethylene glycol, propylene glycols, 1,3- and 1,4-butanediols, neopentyl glycol, 1,6-hexanediol and the like], and/or polyglycols [adducts of one or more alkylene oxides (hereinafter referred to as AO), such as ethylene oxide (hereinafter referred to as EO), propylene oxides (hereinafter referred to as PO), 1,2- 2,3- 1,3- and 1,4-butylene oxides, styrene oxide, epichlorohydrin and the like, and combinations of two or more of them (random- or block-addition, or combination, such as random followed by block)] to one or more compounds containing two active hydrogen atoms in the molecule, such as alkylene glycols as mentioned above and initiators for polyether polyols described below. [Said adducts contain generally 1-20, preferably 1-10, more preferably 2-10 oxyalkylene units (AO units) per mole; and (1-ii) mixed esters of one or more ethylenically unsaturated mono- or poly-carboxylic acids, as above, with glycols as above and mono-ols [$C_1$-$C_{20}$ monohydric alcohols (for example, monohydric aliphatic alcohols, such as methanol, ethanol and the like)], and AO adducts thereof, containing generally 1-20, preferably 1-10 AO units per mole.

These esters may be produced, for instance, by reacting glycol(s) with unsaturated carboxylic acid(s) or ester-forming derivative(s) thereof (such as anhydrides, lower alkyl esters and so on), or by reacting AO with unsaturated carboxylic acid(s).

Among these esters, preferred are esters of (meth)acrylic, maleic and fumaric acids. More preferred are (meth)acrylic esters (particularly methacrylic esters), are (meth)acrylic esters (particularly methacrylic esters), especially those of the formula (I):

$$CH_2=CR-COO(A-O)_nH \qquad (I)$$

wherein R is H or methyl radical; A is ethylene or propylene radical, or combination of them; and n is an integer of 1-20.

Esters of the formula (I) include hydroxyethyl (meth)acrylates, hydroxypropyl (meth)acrylates, polyoxyethylene (meth)acrylates, polyoxypropylene (meth)acrylates and polyoxyethylene-polyoxypropylene (meth)acrylates.

Among these, preferred are hydroxyethyl (meth)acrylates, hydroxypropyl (meth)acrylates, polyoxypropylene (meth)acrylates and polyoxyethylene-polyoxypropylene (meth)acrylates containing 2-20 oxyalkylene units [n in the formula (I) being 2-20]. More preferred are hydroxyethyl methacrylates, hydroxypropyl methacrylates and polyoxypropylene methacrylates containing 2-20 oxypropylene units, particularly those containing 2-10 oxypropylene units.

Suitable polymerizable unsaturated aliphatic alcohols (2) include, for example, unsaturated mono- and polyhydric alcohols, such as vinyl alcohol, (methyl)allyl alcohols, crotyl alcohol, isocrotyl alcohol, butene mono-ols (1-butene-3-ol and 2-butene-1-ol), butene diols (2-butene-1,4-diol and 1-butene-1,4-diol), propargyl alcohol and the like; and AO adducts thereof containing generally 1-20, preferably 1-10 oxyalkylene units (AO units) per mole.

Among these unsaturated alcohols, preferred are vinyl alcohol, (meth)allyl alcohols, 2-butene-1,4-diol and propargyl alcohol; particularly vinyl alcohol, allyl alcohol and 2-butene-1,4-diol.

Exemplarly of suitable N-alkylol acrylamides are $N-C_1-C_4$alkylol acrylamides such as N-methylol acrylamide and N-ethylol acrylamide.

These hydroxyl-containing monomers (a) may be used alone or as a mixture of two or more of them.

Instead of, or in conjunction with hydroxyl-containing monomers (a), precursor(s) thereof [monomer(s) containing hydroxyl radical-forming group(s)] may be used for polymerization to produce polymer polyols containing hydroxyl radical-forming groups, followed by converting the hydroxyl radical-forming groups into hydroxyl radicals afterwards to obtain pendant hydroxyl-containing polymer polyols in accordance with the present invention.

Suitable monomers containing hydroxyl radical-forming group(s) are monomers containing ester group(s) capable of forming hydroxyl radical(s) by hydrolysis; and include, for example, esters of polymerizable unsaturated aliphatic alcohols, as mentioned above, with acids. Exemplary of suitable acids for forming such esters are carboxylic acids, including $C_1-C_{20}$ fatty acids, particularly lower fatty acids, such as acetic, propionic and butyric acids, and so on. Illustrative examples of hydroxyl-forming unsaturated esters include vinyl acetate and vinyl propionate.

Suitable examples of unsaturated nitriles (b), which can be used together with hydroxyl-containing monomers (a) or precursors thereof, are (meth)acrylonitriles. Particularly, acrylonitrile is preferred.

Monomers, used for producing pendant hydroxyl-containing polymer polyols in accordance with this invention, may optionally contain (c) one or more epoxy radical-containing monomers, and/or (d) one or more other ethylenically unsaturated monomers, in addition to said hydroxyl radical-containing monomer (a) and said unsaturated nitrile (b).

Suitable monomers (c) containing an epoxy radical, which can react with an epoxy curing agent to open the epoxy ring, include, for example, unsaturated hydrocarbon oxides; unsaturated ethers, esters, urethanes, amides, acetals and the like, containing one or more epoxy radicals, such as 1,2-, 1,3-, 1,4- and 1,5-epoxides.

Illustrative examples of suitable epoxy-containing monomers (c) are:

(c-1) hydrocarbon oxides, such as butadiene monooxide and 1-vinyl cyclohexane-3,4-epoxide;

(c-2) unsaturated ethers [including vinyl ethers and (meth)allyl ethers] of epoxy-containing alcohols [such as glycidol, tetrahydrofurfuryl alcohol, tetrahydrofuran (hereinafter referred to as THF) dimethanol and the like, as well as AO adducts of these alcohol], for example, glycidyl ethers, such as vinyl glycidyl ether, (meth)allyl glycidyl ethers, vinyloxyalkyl($C_2-C_4$) glycidyl ethers and (meth)allyloxyalkyl($C_2-C_4$) glycidyl ethers; and THF ring-containing ethers, such as vinyl tetrahydrofurfuryl ether, (meth)allyl tetrahydrofurfuryl ethers, corresponding unsaturated mono- or di-ethers of 2,5-THF dimethanols, corresponding unsaturated ethers of monotetrahydrofurfuryl ethers of glycols (as described above in glycol esters: such as ethylene glycol), and corresponding tetrahydrofurfuryloxymethanol;

(c-3) unsaturated esters, including (i) esters of ethylenically unsaturated mono- or polycarboxylic acids [such as (meth)acrylic, crotonic, maleic, fumaric, itaconic, citraconic, mesaconic, methylenemalonic, aconitic, cinnamic and vinyl benzoic acids] with epoxy-containing alcohol as mentioned above, for example, glycidyl esters, such as glycidyl-(meth)acrylates, crotonate, cinnamate and vinyl benzoate, and diglycidyl- and monoalkyl($C_1-C_{18}$)monoglycidyl-maleate, fumarate, itaconate, citraconate, mesaconate and methylenemalonate; corresponding tetrahydrofurfuryl esters; corresponding esters of AO adducts of glycidol and tetrahydrofurfuryl alcohol; corresponding mono- and di-esters of 2,5-THF dimethanol and AO adducts thereof;

(ii) esters of epoxy-containing carboxylic acids [such as glycidic, 2,3-epoxybutyric, 2,3-epoxy-2-methylbutyric, 2,3-epoxy-3-methylbutyric, epoxysuccinic and THF-2-carboxylic acids] with ethylenically unsaturated alcohols [such as (meth)allyl alcohols and AO adducts thereof]; and (iii) mixed esters of epoxy-containing alcohols as above and unsaturated alcohols as above with polycarboxylic acids [including $C_2-C_{10}$aliphatic and aromatic dicarboxylic acids, such as adipic, azelaic and sebacic acids, and phthalic acids];

(c-4) unsaturated urethanes and amides, such as those obtainable by reacting active hydrogen atom-containing epoxy compounds [such as epoxy-containing alcohols and carboxylic acids as mentioned above and AO adducts of them] and active hydrogen atom-containing unsaturated compounds [such as unsaturated alcohols and carboxylic acids as mentioned above and AO adducts thereof] with organic polyisocyanates [those as described below (such as tolylene diisocyanate) and NCO-terminated prepolymers derived therefrom];

(c-5) unsaturated acetals, such as hemiacetals and acetals of epoxy-containing aldehydes [such as tetrahydrofurfural] with unsaturated alcohols as above; acetals of epoxy-containing aldehydes as above with unsaturated alcohols as above and saturated monohydric alcohols [including $C_1-C_{18}$alcohols, such as methanol]; acetals of epoxy-containing aldehydes as above with unsaturated alcohols as above and unsaturated aldehydes [such as acrolein and crotonaldehyde] with polyhydric alcohols [as described below, such as pentaerythritol].

These epoxy-containing monomers (c) may be used solely or as a mixture of two or more of them.

Among these monomers (c), preferred are unsaturated carboxylic esters, particularly (meth)acrylates, of epoxy-containing alcohols, especially glycidol and tetrahydrofurfuryl alcohol. More preferred are glycidyl (meth)acrylates, and the most preferred is glycidyl methacrylate.

Suitable examples of said other ethylenically unsaturated monomers (d) are: unsaturated hydrocarbon monomers, such as butadiene, isoprene, 1,4-pentadiene, 1,6-hexadiene, 1,7-octadiene, styrene, alpha-methylstyrene, methylstyrenes, 2,4-dimethylstyrene, ethylstyrenes, isopropylstyrenes, butylstyrenes, phenylstyrenes, cyclohexylstyrenes, benzylstyrenes and vinylnaphthalenes; substituted styrenes, such as cyanostyrenes, nitrostyrenes, N,N-dimethylaminostyrenes, acetoxystyrenes, methyl 4-vinylbenzoate, phenoxystyrenes, p-vinyl diphenyl sulfide, p-vinylphenyl phenyl oxide, chlorostyrenes, 2,5-dichlorostyrene, bromostyrenes, fluoro-styrenes, trifluoromethylstyrenes and iodostyrenes; acrylic and substituted acrylic monomers, such as (meth)acrylic acids, methyl (meth)acrylates, ethyl (meth)acrylates, isopropyl (meth)acrylates, butyl (meth)acrylates, 2-ethylhexyl (meth)acrylates, octyl (meth)acrylates, cyclohexyl (meth)acrylates, benzyl (meth)acrylates, phenyl (meth)acrylates, methyl alphachloroacrylate, ethyl alpha-ethoxyacrylate, methyl alpha-acetamidoacrylate, alpha-chloroacrylonitrile, N,N-dimethylacrylamide, N,N-dibenzylacrylamide, N-butylacrylamide and (meth)acryl formamide; vinyl esters, vinyl ethers, vinyl ketones, etc, such as vinyl acetate, vinyl chloroacetate, vinyl butyrate, isopropenyl acetate, vinyl formate, vinyl (meth)acrylates, vinyl methoxyacetate, vinyl benzoate, vinyl chloride, vinyl iodide, vinyl bromide, vinyl fluoride, vinylidene chloride, vinylidene iodide, vinylidene bromide, vinylidene fluoride, 1-chloro-1-fluoroethylene, vinyl methyl ether, vinyl ethyl ether, vinyl propyl ether, vinyl butyl ether, vinyl 2-ethylhexyl ether, vinyl phenyl ether, vinyl 2-methoxy-ethyl ether, methoxybutadiene, vinyl 2-butoxyethyl ether, 2-butoxy-2'-vinyloxy diethyl ether, 3,4-dihydro-1,2-pyran, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinylimidazole, divinyl sulfide, divinyl sulfoxide, divinyl sulfone, sodium vinyl sulfonate, methyl vinyl sulfonate, N-vinyl pyrrole and vinyl pyridines; dimethyl fumarate, dimethyl maleate, maleic acid, crotonic acid, fumaric acid, itaconic acid, mono-methyl itaconate, t-butylaminoethyl(meth)acrylate, dimethyl-aminoethyl (meth)acrylate, dichlorobutadiene, and the like.

Among these monomers (d), preferred are vinyl aryl monomers [especially styrene and alpha-methylstyrene] and alkyl alkenoates [especially methyl and ethyl (meth)acrylates]. More preferred are methyl methacrylate and styrene.

In pendant hydroxyl-containing polymer polyols used in one aspect of the present invention, the amount of said hydroxyl-containing monomer (a) is usually 5–90%, preferably 10–80%, more preferably 15–60%, most preferably 20–40%, based on the total weight of the monomers.

[In the above and also hereinafter % designate % by weight.]

The amount of said unsaturated nitrile (b) is usually 5–90%, preferably 10–80%, more preferably 15–75%, most preferably 20–70%. The total amount of said monomer (c) and (d) is usually 0–60%, preferably 0–40%, more preferably 0–30%, based on the total weight of the monomers (a), (b), (c) and (d). The amount of said other monomer (d) is usually 0–60%, preferably 0–40%, more preferably 0–30%.

In a preferred embodiment of this invention, polymer polyols containing both pendant hydroxyl radicals and epoxy radicals are used in the preparation of polyurethanes, wherein ring-opening reaction of the epoxy radicals are brought about in the presence of an epoxy curing agent, simultaneously with, or before or after the urethane-forming reaction. In this case, said epoxy-containing monomer (C) may be used in higher amount, for instance, 5–90%, preferably 10–80%, more preferably 20–75%, most preferably 30–70%.

Suitable polyols employed for producing pendant hydroxyl-containing polymer polyols include, for example, polyether polyols, polyester polyols, and mixtures of them, both of which polyols are usually used as raw materials for producing polyurethanes.

Illustrative of such polyether polyols are AO adducts of compounds containing at least two active hydrogen atoms, such as polyhydric alcohols, polyhydric phenols, amines, polycarboxylic acids, phosphrous acids and the like. Suitable examples of polyhydric alcohols include diols, such as ethylene glycol, propylene glycol, 1,3- and 1,4-butane diols, 1,6-hexane diol, neopentyl glycol, diethylene glycol, bis(hydroxymethyl)cyclohexane and bis(hydroxyethyl)benzene; and polyols having 3–8 or more hydroxyl groups, such as glycerol, trimethylolpropane, trimethylolethane, hexane triol, pentaerythritol, diglycerol, alpha-methylglucoside, sorbitol, xylitol, mannitol, glucose, fructose, sucrose, and the like. Exemplary of suitable polyhydric phenols are mono- and poly-nuclear phenols, such as hydroquinone, catechol, resorcin, pyrogallol, and bisphenols [bisphenol A, bisphenol f, bisphenol sulfon and the like], as well as phenol-formaldehyde condensation products. Suitable amines are inclusive of ammonia; alkanol amines, such as mono-, di- and tri-ethanol amines, isopropanol amines and the like; aliphatic, aromatic, araliphatic and alicyclic monoamines, such as $C_1$–$C_{20}$ alkyl amines [methyl, ethyl, isopropyl, butyl, octyl and lauryl amines, and the like], aniline, toluidine, naphthyl amines, benzyl amine, cyclohexyl amine and the like; aliphatic, aromatic, araliphatic and alicyclic polyamines, such as $C_2$–$C_6$ alkylene diamines [ethylene diamines], diethylene triamine, tolylenediamines, phenylenediamines, xylylenediamines, methylenedianilines, diphenyletherdiamines, isophoronediamine, cyclohexylenediamines, dicyclohexylmethanediamines and the like; and heterocyclic polyamines, such as piperazine, N-aminoethylpiperazine, and other heterocyclic polyamines, written in Japan Patent Publication No. 21044/1980.

Suitable AO, employed for producing polyether polyols, include, for example, EO, PO, 1,2- 2,3-, 1,3- and 1,4-butylene oxides, styrene oxide, epichlorohydrin and the like, as well as combinations of two or more of them. Among these, preferred are PO and combination of PO/EO [Weight ratio: usually 30/70–100/0, preferably 70/30–95/5]. Addition of AO to active hydrogen atom-containing compounds can be carried out in the usuall way, with or without catalysts [such as alkaline catalysts, amine catalysts and acidic catalysts], under normal or elevated pressure, in a single step or multistages. Addition of different AO [PO and EO] may be performed by random-addition, block-addition or combination of them [for instance, random-addition followed by block-addition].

Suitable polyester polyols are inclusive of condensation products of dihydric and/or trihydric alcohols [ethylene glycol, propylene glycol, 1,3- and 1,4-butane diols, 1,6-hexane diol, neopentyl glycol, diethylene glycol, glycerol, trimethylolpropane and the like] and/or polyether polyols [such as those described above] with dicarboxylic acids [aliphatic or aromatic dicarboxylic acids, such as glutaric, adipic, sebacic, fumaric, maleic, phthalic and terephthalic acids] or ester-forming derivatives thereof [anhydrides and lower alkyl esters, such as maleic and phthalic anhydrides, dimethyl terephtharate, and the like]; ring-opening polymerization products of lactones [such as epsilon-caprolactone].

These polyols, used for producing pendant hydroxyl-containing polymer polyols, have usually 2–8 hydroxyl groups, preferably 2–4 hydroxyl groups, and have OH equivalent weight of usually 200–4,000, preferably 400–3,000.

Among these polyols, polyether polyols are preferred to polyester polyols. Preferable polyether polyols are ones containing up to 30% of tipped oxyethylene units at the molecular end and 0–50% of randomly distributed oxyethylene units in the molecule. More preferred are ones containing 5–25% of tipped oxyethylene units at the molecular end and 5–40% of randomly distributed oxyethylene units in the molecule. Content of the primary hydroxyl groups of polyether polyols is preferably at least 30%, more preferably at least 50%, most preferably at least 70%.

Instead of or in combination with these polyols [polyether polyols and polyester polyols] modified polyols, for example, urethane-modified polyols [OH-terminated urethane prepolymers] prepared from organic polyisocyanates and excess of these polyols, polyols containing polymerizable unsaturated bonds in the molecules [such as maleic anhydride-modified polyols], and polymer polyols free from pendant hydroxyl radicals, previously prepared by polymerizing one or more hydroxyl-free monomers [such as said monomer (b), and combinations thereof with said monomers (c) and/or (d)] in situ in these polyols, may also be employed for producing pendant hydroxyl-containing polymer polyols in accordance with this invention.

In producing pendant hydroxyl-containing polymer polyols, the total amount of monomers [(a) and (b) and optionally (c) and/or (d)] is generally 50–250 parts, preferably 70–160 parts, more preferably 85–125 parts per 100 parts of the polyol.

[In the above and hereinafter, parts designate parts by weight.]

In case where a polymer polyol prepared beforehand is used as the starting polyol, the amount of the monomers in the above include that contained in the polymer portion of the polymer polyol.

Preparation of polymer polyols from polyols and monomers can be carried out in the usual way, for example, by polymerizing monomers in polyols in the presence of polymerization initiators [such as radical generators], as described in U.S. Pat. No. 3,383,351 and Japan Patent Lay-Open No. 15,894/1975; or by grafting polymers, prepared from monomers before hand, to polyols in the presence of radical generators, as described in Japan Patent Publication No. 47,597/1972. Preferred is the former method.

Illustrative of suitable polymerization initiators are free radical generators, for example, azo compounds, such as 2,2'-azobisisobutyronitrile [hereinafter referred to as AIBN], 2,2'-azobis(2,4-dimethylvaleronitrile) [hereinafter referred to as AVN] and the like; peroxides, such as methyl isobutyl ketone peroxide, dibenzoyl peroxide, lauroyl peroxide, di-t-butyl peroxide, dicumyl peroxide, t-butyl hydroperoxide, di-isopropyl peroxydicarbonate, t-butyl peroxyisopropylcarbonate, t-butyl peroxy(2-ethylhexanoate), t-butyl peroxypivalate, 2,5-dimethylhexane-2,5-diper-2-ethylhexoate, t-butyl percrotonate, t-butylperisobutyrate, di-t-butyl perphthalate, 1,1-di-t-butyl peroxy-3,3,5-trimethylcyclohexane and the like; persulfates, perborates, persuccinates and so on. Among these, preferred are azo compounds, especially AIBN, from a practical point of view. The amount of polymerization initiator is usually 0.1–20%, preferably 0.2–10% based on the total weight of monomers.

Free radical generation by physical methods, such as by ultraviolet-light irradiation and by electron beem irradiation, may also be employed.

Polymerization of monomers in polyols can be performed without any solvents, but it is preferred to carry out in the presence of one or more solvents in case of producing polymer polyols of high polymer content. Suitable solvents include, for example, benzene, toluene, xylene, acetonitrile, ethyl acetate, hexane, heptane, dioxane, N-,N-dimethylacetoamide, iso-propyl alcohol, n-butanol and the like.

Polymerization may also be carried out in the presence of known chain transfer agents other than alkyl mercaptans, if necessary. Illustrative of suitable chain transfer agents are carbon tetrachloride, carbon tetrabromide, chloroform, and enolethers as described in Japan Patent Lay-Open No. 31,880/1980.

Polymerization is carried out at temperature above the decomposition temperature of the polymerization initiator, usually at 60°–180° C., preferably at 90°–160° C., more preferably at 100°–150° C., under atmospheric pressure, under pressure or under reduced pressure. Polymerization may be done continuously or batchwise.

In case where a precursor monomer containing a hydroxyl radical-forming group (ester group capable of forming hydroxyl radical by hydrolysis) is used instead of hydroxyl-containing monomer (a), at least a part of hydroxyl radical-forming ester groups of the resulting polymer polyols can be converted to hydroxyl radicals by hydrolysis or alcoholysis. Hydrolysis and alcoholysis can be performed in the usual way. Generally, hydrolysis and/or alcoholysis can be carried out by treating polymer polyols containing hydroxyl radical-forming ester groups with usually 0.5–100 moles, particularly 1–50 moles (per 1 equivalent of the hydroxyl radical-forming ester group) of water, lower alcohol [especially methanol] or a mixture of them in the presence of basic catalysts [alkaline catalysts, such as NaOH and KOH; or amine catalysts, such as cycloamidines or diazabicycloalkenes, having the general formula:

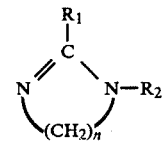

[wherein $R_1$ is H or an alkyl group having 1-8 carbon atoms, $R_2$ is an alkyl group having 1-8 carbon atoms, or $R_1$ and $R_2$ may be joined to form a ring having 2-11 methylene groups, n is an integer of 2-6, and each of the methylene groups may carry a lower alkyl substituent.], as disclosed in U.S. Pat. No. 4,524,104, for example, 1,8-diazabicyclo[5,4,0]-7-undecene (hereinafter referred to as DBU)] or acidic catalysts [such as hydrochloric acid, sulfuric acid and phosphoric acid], usually for 0.5–50 hours [preferably 1–10 hours] at 20°–150° C. [preferably 30°–100° C.].

Polymer polyols obtained after polymerization (and optionally hydrolysis and/or alcoholysis) may be used as raw materials for polyurethane, as such without any after-treatment; but it is desirable to remove impurities such as decomposition products of polymerization initiators. unreacted monomers, organic solvents and so on, by conventional means.

Pendant hydroxyl-containing polymer polyols thus obtained are translucent or opaque, white or brownish yellow dispersions, in which all the monomers polymerized, namely, polymers are stably dispersed in polyols.

Polymer content of said polymer polyols is generally 30–70%, preferably 40–60%, more preferably 45–55%, most preferably 50–55%. Polymer content may vary to somewhat broader extent [10–70%], in case where said polymer polyol contains epoxy radicals or is used in conjunction with an epoxy-containing polymer polyol.

Hydroxyl value of pendant hydroxyl-containing polymer polyols is generally 10-300, preferably 20-250, more preferably 30-200 mgKOH/g.

In producing polyurethanes according to the present invention, pendant hydroxyl-containing polymer polyol can be used in conjunction with one or more other polyols, if desired.

Illustrative of such polyols are high molecular weight polyols containing at least two hydroxyl groups and having OH equivalent weight of 200-4,000, for example, the same ones as described as the raw materials for pendant hydroxyl-containing polymer polyols, namely polyether polyols, polyester polyols, urethane-modified polyols, vinyl-modified polyols and polymer polyols free from pendant hydroxyl radicals; as well as polyols from natural oils such as castor oil.

These high molecular weight polyols are used in an amount of usually 0-500 parts, preferably 0-300 parts, more preferably 0-200 parts per 100 parts of pendant hydroxyl-containing polymer polyols.

Among these polyols, preferred are polyether polyols and polymer polyols therefrom. More preferred are polyether polyols, having OH equivalent weight of 200-4,000 [particularly 400-3,000], obtained by addition of one or more $C_2$-$C_4$ AO [especially PO and combination thereof with EO] to compounds containing 2-8 [particularly 2-4] active hydrogen atoms; and polymer polyols therefrom, produced by polymerizing said monomer (b) [especially acrylonitrile] or combination thereof with said monomer (c) [particularly glycidyl methacrylate] and/or said monomer (d) [especially styrene and/or methyl methacrylate] in situ in the above polyether polyols.

As another preferred embodiment of this invention, said pendant hydroxyl-containing polymer polyol [A] and one or more epoxy-containing polymer polyols [B] are used in conjunction in the preparation of polyurethanes, wherein ring-opening reaction of the epoxy radicals of [B] are brought about in the presence of an epoxy curing agent, simultaneously with, or before or after the urethane-forming reaction. In this case, said pendant hydroxyl-containing polymer polyol [A] may contain said units (a) and (b) in somewhat higher amount [up to 95%]. Said epoxy-containing polymer polyols [B] may be produced by polymerizing, in situ in polyols [such as polyether polyols], monomers comprising usually 5-95%, preferably 10-90%, more preferably 20-80%, most preferably 30-70% of said unsaturated nitrile (b), usually 5-95%, preferably 10-90%, more preferably 20-80%, most preferably 30-70% of said epoxy-containing monomer (c) and 0-60%, preferably 0-40%, more preferably 0-30% of said other monomer (d), based on the total weight of monomers. Said polymer polyols [B] may contain polymers [polymerized monomers] in an amount of usually 10-70%, preferably 30-60%, more preferably 40-55%. The polyol component, in the above preferred embodiment, can comprises 10-90% of said polymer polyol [A] and 10-90% of said polymer polyol [B], and the other high molecular weight polyols are used in an amount of usually 0-500 parts, preferably 0-300 parts, more preferably 0-200 parts per 100 parts of the total of [A] and [B].

In this invention, there may be used to react with organic polyisocyanates, high molecular weight or low molecular weight active hydrogen atom-containing compounds other than pendant hydroxyl-containing polymer polyols, epoxy-containing polymer polyols and other high molecular weight polyols described above.

Examples of such high molecular weight active hydrogen atom-containing compounds are polyether polyamines, having equivalent weight of 200-4,000 and containing at least two active hydrogen atom-containing groups mainly consisting of amino groups as the terminal groups, produced by reacting ammonia with polyether polyols under pressure.

Suitable low molecular weight active hydrogen atom-containing compounds, include compounds containing at least two [preferably 2-5] active hydrogen atoms and having equivalent weight [molecular weight per active hydrogen atom-containing groups] of at least 30 and less than 200, which compounds are generally called crosslinkers or chain-extenders. Illustrative examples are dihydric and trihydric alcohols, such as ethylene glycol, diethylene glycol, propylene glycols, 1,3- and 1,4-butane diols, 1,6-hexane diol, glycerol, trimethylolpropane and the like; amines, such as mono-, di-, tri-ethanol amines, isopropanol amines, tolylene diamines, diethyltolylenediamines, methylene dianilines, methylenebis(o-chloroaniline) and the like; and polyhydroxyl compounds having equivalent weight of less than 200, obtainable by adding lower amount of one or more AO [such as EO and/or PO] to active hydrogen atom-containing compounds, such as di-and trihydric alcohols as mentioned above, polyhydric alcohols containing 4-8 hydroxyl groups [such as pentaerythritol, methylglucoside, sorbitol, sucrose and the like], polyhydric phenols [such as bisphenol A, hydroquinone and the like], amines as described above, and other amines than above [such as ethylene diamine, diethylene triamine; aminoethylpiperazine, aniline and the like]. Low molecular weight active hydrogen atom-containing compounds may be used generally in an amount of 0-100 parts, preferably 0-50 parts, more preferably 0-30 parts per 100 parts of high molecular weight polyols comprising pendant hydroxyl-containing polymer polyols.

Amount of pendant hydroxyl-containing polymer polyols in the whole active hydrogen atom-containing compounds is usually 20-100%, preferably 30-100%. Content of polymer moiety [derived from polymerizable monomers] of said polymer polyols in the whole active hydrogen atom-containing compounds is generally 5-70%, preferably 25-60%, more preferably 30-55%.

In producing polyurethanes according to the invention, there can be used any of organic polyisocyanates, conventionally employed for production of polyurethanes. Suitable polyisocyanates include, for example, aromatic polyisocyanates containing 6-20 carbon atoms [except carbon atoms in NCO groups], such as 1,3- and 1,4-phenylenediisocyanates, 2,4- and 2,6-tolylenediisocyanates [TDI], diphenylmethane-2,4'- and 4,4'-diisocyanates [MDI], naphthalene-1,5-diisocyanate, triphenylmethane-4,4',4"-triisocyanate, polymethylenepolyphenylenepolyisocyanates [PAPI] obtained by phosgenation of aniline-formldehyde condensation products, m- and p-isocyanato-phenyl sulfonyl isocyanate, and the like; aliphatic polyisocyanates containing 2-18 carbon atoms, such as ethylenediisocyanate, tetramethylenediisocyanate, hexamethylenediisocyanate, dodecamethylenediisocyanate, 1,6,11-undecanediisocyanate, 2,2,4-trimethylhexanediisocyanate, lysine diisocyanate, 2,6-diisocyanato-methyl caproate, bis(2-isocyanato-ethyl fumarate, bis(2-isocyanatoethyl)carbonate, 2-isocyanato-ethyl-2,6-diisocyanato-hexanoate, and the like; alicyclic polyisocyanates containing 4-15 carbon atoms, such as isophorone diisocyanate, dicyclohexylmethane diisocyanates, cyclohexylene diisocyanates, methylcyclohexylene diisocyanates, bis(2-isocyanato-ethyl) 4-cyclohexene-1,2-dicarboxylate, and the like; araliphatic polyisocyanates containing 8-15 carbon atoms; such as xylylene diisocyanates, diethylbenzene diisocyanates, and the like; and modified polyisocyanates of these polyisocyanates, containing urethane, carbodiimide, allophanate, urea, biuret, urethdione, urethimine, isocyanurate and/or oxazolidone groups, such as urethane-modified TDI, carbodiimide-modified MDI, urethane-modified MDI, and the like; as well as mixtures of two or more of them. Among these polyisocyanates, preferred are TDI [including 2,4- and 2,6-isomers, mixtures of them and crude TDI] and MDI [including 4,4'- and 2,4'-isomers, mixtures of them and crude MDI or PAPI], and modified polyisocyanates containing urethane, carbodiimide, allophanate, urea, biuret and/or isocyanurate groups, derived from TDI and/or MDI.

In preferred embodiments of the present invention, wherein a pendant hydroxyl-containing polymer polyol containing epoxy-radicals or a combination of a pendant hydroxyl-containing polymer polyol and an epoxy-containing polymer polyol is used as at least a part of the polyol component, there may be used, if necessary, any of epoxy-curing agents for ring-opening reaction of epoxy radicals, generally employed for curing of conventional epoxy resins, for example, such as agents as described in "EPOXY RESINS AND PRODUCTS, Recent Advance" (published 1977 by Noyes Data Corporation, U.S.A.), pages 301-347; "KUNSTSTOFF-HANDBUCH, BandXI, Polyacetale, Epoxid-harze, fuluorhaltige Polymerisate, Silicone usw." (published 1971 by Carl Hanser Verlag, Munchen), pages 106-120; and "EPOXY RESINS" (published Sept. 30, 1970 by Shokodo, Japan), pages 109-149.

Suitable curing agents are inclusive of polyamines, for example, aliphatic polyamines, containing 2-18 carbon atoms, including alkylene($C_2$-$C_6$)diamines, such as ethylene diamine, tetramethylene diamine, hexamethylene diamine and the like, polyalkylene($C_2$-$C_6$)polyamines, such as diethylene triamine, iminobispropylamine, bis(hexamethylene)triamine, triethylene tetramine, tetraethylene pentamine, pentaethylene hexamine and the like, and alkyl($C_1$-$C_4$)-substituted or hydroxyalkyl($C_2$-$C_4$)-substituted products of these amines, such as dialkyl($C_1$-$C_3$)aminopropyl amine, aminoethyl ethanol amine, methyliminobispropylamine and the like, alicyclic or heterocyclic ring-containing aliphatic polyamines, such as 3,9-bis(3-aminopropyl)-2,4,8,10-tetraoxaspiro(5,5)undecane and the like; alicyclic or heterocyclic polyamines, containing 4-15 carbon atoms, such as menthane diamine, N-aminoethylpiperazine, 1,3-diaminocyclohexane; isophorone diamine, dicyclohexylmethane diamine and the like; araliphatic polyamines, containing 8-15 carbon atoms, such as xylylene diamines, tetrachloro p-xylylene diamine and the like; aromatic polyamines, such as phenylene diamines, tolylene diamines, methylene dianilines, diaminodiphenyl sulfones, benzidine, 4,4'-bis(o-toluidine), thiodianiline, methylene bis(o-chloroaniline), bis(3,4-diaminodiphenyl)sulfone, diaminoditolyl sulfones, 2,6-diamino pyridine, 4-chloro-o-phenylene diamine, 4-methoxy-6-methyl-m-phenylenediamine, m-aminobenzyl amine, 4,4'-diamino-3,3'-dimethyl diphenyl methane, diethyl tolylene diamines, alkyl($C_1$-$C_4$)-3,5-diamino-4-chlorobenzoates, and the like; polyamide polyamines, such as condensation products of amines as above with polymerized fatty acids [such as dimer acid]; polyether polyamines, described above as said high molecular weight active hydrogen atom-containing compounds; dicyandiamides; and so on.

Other examples of suitable curing agents are polycarboxylic acids, containing 4-30 carbon atoms, such as succinic, maleic, itaconic, azelaic, sebacic, phthalic tetrahydrophthalic, methyltetrahydrophthalic, hexahydrophthalic, methylhexahydrophthalic, nadic, methylnadic, dodecenyl succinic, pyromellitic, trimellitic, chlorendic, mellophanic, benzophenone tetracarboxylic and cyclopentadiene tetracarboxylic acids, phenylene-bis(3-butane-1,2-dicarboxylic acid), and the like, as well as anhydrides of these acids; and Lewis acids, such as $BF_3$, $FeCl_3$, $AlCl_3$, $SnCl_4$, $ZnCl_2$, aluminum alkoxide, $BF_3$-amine complexes, and the like.

Organic polyisocyanates described above, which can react with epoxy radicals to form oxazolidone, are also suitable epoxy curing agents.

Polysulfide resins and other known epoxy curing agents may also be used.

Among these epoxy curing agents, preferred are organic polyisocyanates, acid anhydrides and polyamines. More preferred are organic polyisocyanates and acid anhydrides, particularly the formers. Among organic polyisocyanates, preferred are aromatic ones, such as TDI and MDI and modified products of them. MDI and modified polyisocyanates thereof, especially the latters, are the most preferred. Among acid anhydrides, preferred are liquid ones, particularly hydrogenated phthalic anhydrides and methyl-substituted hydrogenated phthalic anhydrides. Among polyamines, preferred are aromatic ones, such as alkyl($C_1$-$C_4$) 4-chloro-3,5-diamino-benzoates, methylene dianilines and diethyl tolylene diamines.

The amount of epoxy curing agent is not critical and will depend on the nature of said agent and so on. Generally 0.5-200 parts, preferably 1-100 parts of said agent [usually 0.5-20 parts, preferably 1-10 parts, in case of Lewis acid] can be used per 100 parts of the total of pendant hydroxyl-containing polymer polyols and epoxy-containing polymer polyols.

In producing polyurethanes according to this invention, there may be used, if necessary, any known materials, such as blowing agents, catalysts, accelerators and other auxiliaries, usually employed in producing polyurethanes. (1) Illustrative of suitable blowing agents are halogenated hydrocarbons, such as methylene chloride, chloroform, ethylidene dichloride, vinylidene chloride, trichlorofluoromethane, dichlorofluoromethane and the like; low-boiling hydrocarbons, such as butane, hexane, heptane and the like; volatile organic solvents without halogen, such as acetone, ethyl acetate, diethylether and the like; reactive blowing agents, such as water, which generates carbon dioxide by reaction with polyisocyanate, and the like; and combinations of two or more of them. The amount of blowing agent can be varied according to the desired density of polyurethanes, which may vary widely, for instance, from 0.01 to 1.4 g/cm$^3$.

(2) Examples of suitable catalysts, which catalyze reactions of NCO group with active hydrogen atom-containing groups [OH, $NH_2$, NH and so on] and/or between NCO groups each other, are amine catalysts, including tertiary amines, secondary amines, alkanolamines and quaternary ammonium hydroxides, for example, triethylamine, tributylamine, N-methylmorpholine, N-ethylmorpholine, N,N,N',N'-tetramethylethylenediamine, pentamethyldiethylenetriamine, triethylenediamine, N-methyl-N'-dimethylaminoethyl-piperazine, N,N-dimethylbenzylamine, N,N-dimethylcyclohexylamine, N,N,N',N'-tetramethyl-1,3-butanediamine, 1,2-dimethylimidazole, dimethylamine, N-methyldiethanolamine, N-ethyldiethanolamine, N,N-dimethylethanolamine, N,N-diethylethanolamine, tetraalkylammonium hydroxides [such as tetramethylammonium hydroxide], aralkyltrialkylammonium hydroxides [such as benzyltrimethylammonium hydroxide], diazabicycloalkenes as disclosed in U.S. Pat. No. 4,524,104 [such as DUB], and the like; alkaline catalysts, including phenoxides, hydroxides, alkoxides and carboxylates of alkali metals [such as sodium and potassium], for example, sodium phenolate, potassium hydroxide, sodium methoxide, potassium acetate, sodium acetate, potassium 2-ethylhexanoate and the like; phosphines, such as triethylphosphine; metal chelete compounds, such as potassiumsalicylaldehyde complex; organo tin compounds, including $Sn^{II}$ and $Sn^{IV}$ compounds, such as stannous acetate, stannous octoate [stannous 2-ethylhexoate], dibutyltin oxide, dibutyltin dichloride, dibutyltin diacetate, dibutyltin dilaurate, dibutyltin maleate, dioctyltin diacetate and the like; other organo metal compounds, such as dialkyl titanate, lead naphtenate, and so on. Catalysts for trimerization of NCO groups forming isocyanurate ring, such as tris(-dimethylaminomethyl)phenol, N,N',N''-tris(dimethylaminopropyl)hexahydro-s-triazine and the like, may also be used. These catalysts are used in small amounts, for instance, from about 0.001 to about 5% based on the weight of the reaction mixture. (3) Suitable epoxy curing accelerators, which accelerate ring-opening reaction, especially ring-opening crosslinking reaction, include, for example, amines, such as pyridine, quinoline, imidazole, N,N-dimethylcyclohexylamine, triethylamine, N-methylmorpholine, N-ethylmorpholine, triethylenediamine, N,N-dimethylaniline, N,N-dimethylbenzylamine, tris(N,N-dimethylaminomethyl)phenol, and the like; basic alkali metal compounds, such as sodium methoxide, potassium hydroxide, potassium 2-ethylhexanoate and the like; metal halides, such as $SnCl_4$, $FeCl_3$, $AlCl_3$, $SbCl_5$, $ZnCl_2$, $ZnBr_2$, KI, LiCl and the like; organo metal compounds, such as triethyl aluminum, aluminum isopropoxide, tetraisopropyl titanate, diethyl zinc, n-butoxy lithium, zinc acetate, lead 2-ethylhexanoate, acetylacetonates of metals [such as Fe and Co], and the like; quaternary ammonium compounds, such as tetramethylammonium chloride, tetramethylammonium bromide, trimethylbenzylammonium chloride, tetramethylammonium hydroxide and the like; phosphorus compounds and boron compounds, such as trialkylphosphines, trialkylphosphine oxides, phosphonium salts, trialkyl borates, triaryl borates, tricycloalkyl borates, and the like. The amount of these accelerators is usually 0.01–20%, preferably 0.1–10%, based on the weight of the total of pendant hydroxyl-containing polymer polyols and epoxy-containing polymer polyols. (4) Exemplary of other auxiliaries are surfactants, as emulsifiers and foam stabilizers, particularly silicone surfactants [polysiloxane-polyoxyalkylene copolymers] being important. Illustrative of other known additives are flame retardants [such as phosphorus compounds, halogen compounds, $Sb_2O_3$ and the like], retarders [such as acidic compounds], colorants [pigments and dyes], internal mold release agents [such as hydrocarbon waxes and silicone compounds], age resistors, antioxidants, plasticizers, germicides, fillers [such as carbon black, titanium dioxide, diatomaceus earth, glass fiber, shattered glass fiber, talc, mica, silica, sand, aluminum powder, graphite, asbestos, and the like].

In this invention, organic polyisocyanate, which is reacted with active hydrogen atom-containing component to form polyurethane, is used in such an amount to provide NCO index of usually 65–120, preferably 75–110, more preferably 85–100. But, apparent NCO index may become different from the above range, depending upon the kind of the epoxy curing agent. In case polyisocyanate is used for epoxy curing, equivalent ratio of NCO groups/[active hydrogen atom-containing groups+epoxy groups] is usually 0.7–1.3, preferably 0.8–1.2, more preferably 0.85–1.1, most preferably 0.9–1.05. When acid anhydride or polyamine is used as curative, ratio of [NCO equivalent+equivalent of the curative]/[active hydrogen atom-containing group equivalent+epoxy radical equivalent] is generally 0.7–1.3, preferably 0.8–1.2, more preferably 0.85–1.1, most preferably 0.9–1.05. Furthermore, drastically higher NCO index [for instance 300–1,000 or more] than the range stated above may be employed to introduce isocyanurate linkages into polyurethanes. [In this case, apparent NCO index and the above-mentioned equivalent ratio are increased in accordance with higher NCO index as above].

Polyurethanes of the present invention can be produced in known manners, including one-shot process, semiprepolymer process and prepolymer process. Production of various non-cellular or cellular polyurethanes may be carried out in closed mold or open mold, usually by mixing raw materials with low pressure or high pressure mixing machine.

Furthermore, polyurethanes may also be produced under vacuum to eliminate gases, such as air dissolved or mingled in raw materials, before and/or after mixing [particularly before mixing] of the raw materials.

This invention is particularly useful for noncellular or microcellular polyurethane elastomers having a density of 0.8–1.4 g/cm$^3$, especially 0.95–1.4 g/cm$^3$, by RIM method, which elastomers are hereinafter referred to as RIM urethanes. Molding by RIM method can be carried out in the same conditions as conventional RIM method. For instance, raw materials [2–4 components], conditioned at a temperature of 25°–90° C., are intimately mixed in an impingement mixhead under a pressure of 100–200 Kg/cm$^2$G and then injected into a closed mold preheated to a temperature of 30°–200° C. [preferably 60°–90° C.], followed by demolding within 0.1–5 minutes. After demolding, molded articles thus obtained may be further after-cured or annealed. Annealing can be carried out generally for 0.3–100 hours at 60°–180° C. [preferably 80°–160° C., more preferably 100°–150° C.], particularly for 1–30 hours at 120°–140° C.

The invention is also useful for producing high-resilient and firm, flexible and semi-rigid polyurethane foams, suitable for energy absorbers, or cushioning materials of automobiles, furnitures and so on, and for producing cellular and non-cellular rigid polyurethanes, as well as for producing polyurethanes suitable for adhesives, coatings and the like.

Polymer polyols in accordance with the present invention have high content of polymers and pendant hydroxyl radicals on the polymers chains. In reaction with organic polyisocyanates, crosslinking by formation of urethane linkages can be formed, between pendant hydroxyl radicals of polymer portions in pendant hydroxyl-containing polymer polyols, and/or between pendant hydroxyl radical of polymer portion and hydroxyl group of polyol portion in polymer polyols. It is characteristic of this invention to introduce into polyurethanes high content of polymer and crosslinked structure derived from pendant hydroxyl radicals of said polymer polyols, whereby can be produced polyurethanes having excellent rigidity as well as remarkably improved properties such as mechanical strength, heat resistance and impact resistance, as compared with polyurethanes obtained from conventional polymer polyols [such as those produced by polymerizing acrylonitrile or combination thereof with styrene].

In preferred embodiments of this invention [in case of using pendant hydroxyl-containing polymer polyols containing epoxy radicals, or using pendant hydroxyl-containing polymer polyols in conjunction with epoxy-containing polymer polyols], there can be formed crosslinking by ring-opening reaction of epoxy radicals, between polymer portions of epoxy-containing polymer polyols, between polymer portion of epoxy-containing polymer polyol and polymer portion of pendant hydroxyl-containing polymer polyol, and/or between polymer portion of epoxy-containing polymer polyol and polyurethane segment. In these cases, polyurethanes of synergistically improved properties can be attained, by crosslinking by pendant hydroxyl radicals and crosslinking by ring-opening reaction of epoxy radicals.

It is one of advantages of the present invention that extremely high-rigid [flexural modulus of not less than 7,000, particularly 10,000 or higher] polyurethanes having improved thermal resistance and improved impact resistance [Izod impact strength (notched) of not less than 10 Kgcm/cm at 23° C.] can be obtained easily at low cost. For example, there can be obtained, without adding any reinforcing glass fiber, RIM urethanes, which are equal in rigidities to reinforced RIM polyurethane elastomers (hereinafter referred to as R-RIM urethanes) containing added therein 20% of glass fiber shatters. R-RIM urethanes have inevitable drawbacks such as wearing or damage of equipments through glass abrasion, bad influences of glass fiber upon paintability and appearance of surfaces of molded articles, and anisotropism immenant in molded articles; while RIM urethanes according to the invention are substantially free from such problems and consequently are particularly useful as exterior automotive trim, such as bumpers, fenders, door panels and outer bodies, and as housing of electrical apparatus or appliances.

Having generally described the invention, a more complete understanding can be obtained by reference to certain specific examples, which are included for purposes of illustration only and are not intended to be limiting unless otherwise specified.

Raw materials used in the following examples are as follows:

(1) Monomers
  HEA: Hydroxyethyl acrylate,
  HEMA: Hydroxyethyl methacrylate,
  HPMA: Hydroxypropyl methacrylate,
  TPMA: Trioxypropylene methacrylate,
  HOPMA: Hexaoxypropylene methacrylate,
  VAc: Vinyl acetate;
  ALA: Allyl alcohol,
  BD: Cis-2-butene-1,4-diol,
  NMAA: N-methylol acrylamide,
  FA: Furfuryl alcohol,
  AN: Acrylonitrile,
  GA: Glycidyl acrylate,
  GMA: Glycidyl methacrylate,
  MMA: Methyl methacrylate,
  ST: Styrene.
(2) Polyol A: A dihydric polyol [OH-V: 28], produced by successive addition of 2,000 parts of PO, 500 parts of EO, 2,000 parts of PO and then 700 parts of EO to 76 parts of propylene glycol.
(3) Polyol B: A trihydric polyol [OH-V: 28], produced by adding 5,100 parts of PO and 800 parts of EO to 92 parts of glycerol, followed by tipping 1,000 parts of EO.
(4) Polyol C: A trihydric polyol [OH-V: 56], produced by adding 3,000 parts of PO to 92 parts of glycerol.
(5) Polyol D: A tetrahydric polyol [OH-V: 36], produced by successive addition of 400 parts of EO, 6,000 parts of PO, and then 700 parts of EO to 136 parts of pentaerythritol.
(6) Polymer polyol I: A polymer polyol [OH-V: 22.4, polymer content: about 20%], obtained by radical polymerization of AN in Polyol B.
(7) Polymer polyol II: A polymer polyol [OH-V: 22.4, polymer content: about 20%], obtained by radical polymerization f monomer mixture of AN/St (80:20) in Polyol A.
(8) Millionate MTL: A carbodiimide-modified liquid MDI [NCO content: 28.8%], sold by Nippon Polyurethane Industries, Co, Ltd.
(9) Chain extender or Crosslinker:
  EG: Ethylene glycol,
  DETDA: Diethyl-m-tolylene diamine.
(10) Catalysts:
  DBTDL: Dibutyltin dilaurate,
  DABCO33LV: 33% Solution of triethylene diamine in di propylene glycol,
  NMM: N-methylmorpholine,
  DBU: 1,8-Diazabicyclo[5,4,0]undecene-7
(11) Black toner: A toner prepared by incorporating 50% of carbon black in polyoxypropylene diol of MW 2,000.

Preparation 1

Into an autoclave equipped with a stirrer and temperature control means, were charged 150 parts of Polyol B and 150 parts of xylene, and heated to 120° C. A mixture of 300 parts of Polyol B, 100 parts of HEMA, 355 parts of AN, 55 parts of MMA and 4 parts of AIBN was continuously fed by pump over 2 hours, while maintaining the temperature at 115°–120° C. After stirring for additional 30 minutes at the same temperature, 1.6 parts of AIBN dispersed in 50 parts of Polyol B were added, followed by stirring for 30 minutes. Finally, volatile matters were removed under reduced pressure to obtain a pale brown finely dispersed polymer polyol.

Preparations 2 to 33

By the same manner as in Preparation 1, various polymer polyols were prepared from the raw materials writtin in Table 1.

Preparation 34

Into an autoclave equipped with a stirrer and temperature control means, were charged 100 parts of FA and 150 parts of xylene, and heated to 120° C. A mixture of 500 parts of Polyol B, 355 parts of AN, 55 parts of MMA and 6 parts of AIBN was continuously fed by pump over 4 hours, while maintaining the temperature at 115°–120° C. After stirring for additional 30 minutes at the same temperature, 5 parts of AIBN dispersed in 100 parts of xylene were added, followed by stirring for 30 minutes. Finally, volatile matters were removed under reduced pressure to obtain a yellowish brown finely dispersed polymer polyol.

Preparations 35 to 39

By the same manner as in Preparations 34, various polymer polyols were prepared from the raw materials written in Table 2.

Preparation 40

Into a reaction vessel equipped with a dropping equipment, a reflux condenser, a gas inlet tube, a temperature recorder and a stirrer, were charged 150 parts of methanol and 100 parts of BD, and heated under an atmosphere of nitrogen to 65° C. A mixture of 500 parts of Polyol B, 360 parts of AN, 55 parts of MMA and 10 parts of AVN was added within 5 hours, while maintaining the temperature at 65° C. After stirring for additional 1 hour at the same temperature, 200 parts of 10% solution of AVN in methanol were added at the rate of 50 parts per an hour or over 4 hours, followed by stirring for 1 hour at the same temperature. Finally, volatile matters were removed under reduced pressure to obtain a pale yellowish brown finely dispersed polymer polyol.

Preparations 41 to 46

By the same manner as in Preparation 40, various polymer polyols were prepared from the raw materials written in Table 3. [In these Preparations, additional 10% solution of AVN in methanol was added dropwise at the rate of 50 parts per an hour. In Preparations 42–45, NMAA was added as 25% sulution in methanol.]

Preparations 47 to 55

By the same manner as in Preparation 1, various polymer polyols were prepared from the raw materials written in Table 4.

Properties of polymer polyols thus obtained are shown in Tables 1 to 4.

Preparation 56

Preparation 4 was repeated, except that VAc was used instead of HEMA.

There was obtained a pale brown finely dispersed polymer polyol [polymer content: 49.5%, viscosity: 19,500 cps at 25° C., OH-V: 14.1 mg KOH/g].

Preparation 57

Into a reaction vessel equipped with a reflux condenser, a gas inlet tube, a temperature recorder and a stirrer, were charged 100 parts of the polymer polyol obtained in Preparation 56, 250 parts of methanol and 1 part of DBU, and heated under an atmosphere of nitrogen to 65° C. The reaction mixture was stirred for 7 hours at the same temperature to bring about alcolysis of polymerized VAc in the polymer polyol. Volatile matters were removed at 65°–100° C. in conventional manner, followed by neutralizing the reaction product with 1.1 parts of 2-ethylhexanoic acid.

There was obtained a brown polymer polyol [polymer content: 44.4%, viscosity: 72,000 cps at 25° C., OH-V: 157 mg KOH/g].

TABLE 1

| Preparation No. | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| Kind of Polyol | A | C | D | A | B | A | A | B | C | D | A | C | C | B | B | B |
| Raw Materials, parts | | | | | | | | | | | | | | | | |
| Polyol | 500 | 600 | 400 | 500 | 500 | 600 | 500 | 500 | 600 | 400 | 500 | 600 | 600 | 500 | 500 | 400 |
| HEA | — | — | — | 150 | — | — | 100 | — | 40 | — | 50 | — | — | — | — | — |
| HEMA | — | 80 | 60 | — | — | — | — | 200 | — | 180 | — | — | — | 100 | 150 | 180 |
| HPMA | 50 | — | — | — | 50 | — | — | — | — | — | — | 80 | — | — | — | — |
| TPMA | — | — | — | — | — | — | — | — | — | — | — | — | 40 | — | — | — |
| HOPMA | — | — | — | — | — | 40 | — | — | — | — | — | — | — | — | — | — |
| GA | — | — | — | — | — | — | — | — | — | — | — | — | — | — | — | — |
| GMA | — | — | — | — | — | — | — | — | — | — | — | — | — | — | — | — |
| AN | 355 | 170 | 275 | 370 | 230 | 185 | 355 | — | — | — | 100 | — | 80 | 50 | 100 | 120 |
| MMA | 105 | 170 | 275 | — | 230 | 185 | 55 | 310 | 290 | 120 | 355 | 40 | 290 | 355 | 255 | 310 |
| AIBN | 4+1.6 | 3.5+1.6 | 5+1.8 | 4+1.6 | 4+1.6 | 3.5+1.2 | 4+1.6 | 4+1.6 | 6+1.6 | 6+1.6 | 8+1.6 | 6+1.6 | 6+1.6 | 10+1.6 | 4+1.6 | 6+1.6 |
| Xylene | 150 | 150 | 150 | 150 | 150 | 150 | 150 | 150 | 150 | 150 | 150 | — | 150 | 150 | 150 | 150 |
| Polymer polyol | | | | | | | | | | | | | | | | |
| Dispersion state | Stable | Stable | Stable | Stable | Stable | Stable | Stable | Stable | Stable | Stable | Stable | Stable | Stable | Stable | Stable | Stable |
| Appearance | Pale brown | Pale yellow brown | Pale yellow brown | Pale brown | Pale yellow brown | Pale yellow brown | Yellow brown | Yellow brown | Yellow brown | Yellow brown | Yellow brown | Yellow brown | Pale yellow brown | Yellow brown | Pale brown | Yellow brown |
| Polymer-content, % | 50.2 | 40.5 | 60.1 | 50.4 | 50.1 | 40.0 | 50.2 | 50.0 | 40.4 | 60.1 | 50.1 | 40.6 | 40.5 | 50.0 | 50.0 | 60.2 |
| OH—value, mgKOH/g | 33.4 | 64.5 | 40.3 | 86.4 | 24.8 | 22.0 | 62.5 | 100 | 52.9 | 92.2 | 35.5 | 64.5 | 43.1 | 57.2 | 78.7 | 77.7 |
| Viscosity, cps/25° C. | 18,000 | 7,300 | 30,500 | 17,100 | 11,600 | 8,400 | 19,700 | 9,060 | 12,300 | 26,100 | 16,900 | 9,300 | 8,100 | 21,000 | 11,600 | 24,300 |

| Preparation No. | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|
| Kind of Polyol | B | B | B | B | B | A | C | D | D | B | C | B | B | A | A | B |
| Raw Materials, parts | | | | | | | | | | | | | | | | |
| Polyol | 500 | 500 | 500 | 500 | 500 | 500 | 600 | 600 | 400 | 500 | 600 | 500 | 400 | 500 | 500 | 500 |
| HEA | — | 100 | 100 | — | — | — | — | — | — | 250 | — | — | — | — | — | — |
| HEMA | 100 | — | — | 100 | 150 | 250 | — | — | — | — | — | — | — | — | — | — |
| HPMA | — | — | — | — | — | — | 320 | — | 150 | — | — | — | — | — | — | — |
| TPMA | — | — | — | — | — | — | — | 80 | — | — | — | — | — | — | — | — |
| HOPMA | — | — | — | — | — | — | — | — | — | — | 240 | — | — | — | — | — |
| GA | — | — | — | — | — | — | — | 170 | — | — | — | — | — | — | — | — |
| GMA | 150 | 200 | 100 | 355 | — | — | — | 170 | — | — | — | 200 | 420 | 250 | 150 | 350 |
| AN | 260 | 210 | 310 | 55 | 360 | 260 | 90 | — | 460 | 260 | 90 | 310 | 180 | 260 | 360 | 160 |
| MMA | — | — | — | — | — | — | — | — | — | — | 90 | — | — | — | — | — |
| AIBN | 4+1.6 | 4+1.6 | 4+1.6 | 4+1.6 | 4+1.6 | 4+1.6 | 4+1.6 | 4+1.6 | 4+1.6 | 4+1.6 | 4+1.6 | 4+1.6 | 4+1.6 | 4+1.6 | 4+1.6 | 4+1.6 |
| Xylene | 150 | 150 | 150 | 150 | 150 | 150 | — | 150 | 150 | 150 | — | 150 | 150 | 150 | 150 | 150 |
| Polymer polyol | | | | | | | | | | | | | | | | |
| Dispersion state | Stable | Stable | Stable | Stable | Stable | Stable | Stable | Stable | Stable | Stable | Stable | Stable | Stable | Stable | Stable | Stable |
| Appearance | Yellow brown | Yellow brown | Yellow brown | Yellow brown | Yellow brown | Yellow brown | Yellow brown | Yellow brown | Yellow brown | Yellow brown | Pale yellow brown | Yellow brown | Pale yellow | Pale yellow brown | Yellow brown | Yellow brown |
| Polymer-content, % | 50.2 | 50.1 | 50.1 | 50.0 | 50.1 | 50.2 | 40.7 | 41.3 | 60.0 | 50.0 | 41.1 | 50.1 | 60.0 | 50.2 | 50.0 | 50.3 |
| OH—value, mgKOH/g | 57.1 | 57.1 | 57.1 | 53.0 | 78.7 | 123 | 138 | 38.4 | 72.8 | 135 | 34.2 | 14.0 | 11.2 | 13.9 | 14.0 | 13.9 |
| Viscosity, cps/25° C. | 16,600 | 13,500 | 18,700 | 14,600 | 12,900 | 18,400 | 7,700 | 9,300 | 67,300 | 15,600 | 11,500 | 13,100 | 22,900 | 14,900 | 19,600 | 11,000 |

TABLE 2

| Preparation No. | 35 | 36 | 37 | 38 | 39 |
|---|---|---|---|---|---|
| Kind of Polyol | B | B | B | A | A |
| Raw Materials, parts Polyol | 500 | 500 | 500 | 500 | 500 |
| HEMA | — | — | — | 50 | 50 |
| FA | 150 | — | — | — | — |
| ALA | — | 100 | 150 | — | — |
| PA | — | — | — | 50 | 100 |
| AN | 260 | 360 | 260 | 360 | 260 |
| GA | — | — | — | — | 100 |
| GMA | 100 | — | 100 | — | — |
| MMA | — | 55 | — | 55 | — |
| AIBN | 6 + 10 | 10 + 15 | 10 + 20 | 10 + 20 | 10 + 20 |
| Xylene | 150 + 100 | 150 + 100 | 150 + 100 | 150 + 100 | 150 + 100 |
| Polymer polyol Dispersion state | Stable | Stable | Stable | Stable | Stable |
| Appearance | Yellow brown | Brown | Pale yellow brown | Brown | Yellow brown |
| Polymer-content, % | 49.6 | 49.5 | 49.1 | 50.1 | 49.7 |
| OH—value, mg KOH/g | 99.3 | 110 | 157 | 85.8 | 135 |
| Viscosity, cp/25° C. | 21000 | 14000 | 11000 | 16400 | 14500 |

TABLE 3

| Preparation No. | 41 | 42 | 43 | 44 | 45 | 46 |
|---|---|---|---|---|---|---|
| Kind of Polyol | B | B | B | C | C | D |
| Raw Materials, parts Polyol | 500 | 500 | 500 | 600 | 600 | 400 |
| BD | 150 | — | — | — | 80 | 150 |
| NMAA | — | 100 | 150 | 80 | 80 | — |
| AN | 260 | 355 | 260 | 170 | 260 | 310 |
| GMA | 100 | — | 100 | — | — | 150 |
| MMA | — | 55 | — | 170 | — | — |
| AVN | 10 + 8 | 10 + 3 | 10 + 3 | 4 + 3 | 10 + 8 | 10 + 8 |
| Methanol | 150 + 72 | 150 + 300 + 27 | 150 + 450 + 27 | 150 + 240 + 27 | 150 + 240 + 72 | 150 + 72 |
| Polymer polyol Dispersion state | Stable | Stable | Stable | Stable | Stable | Stable |
| Appearance | Pale yellow brown | Pale yellow brown | Pale yellow brown | Pale yellow brown | Pale yellow brown | Pale yellow |
| Polymer-content, % | 50.2 | 50.0 | 50.1 | 40.4 | 40.2 | 60.1 |
| OH—value, mg KOH/g | 206 | 69.5 | 97.5 | 78.3 | 181 | 206 |
| Viscosity, cps/25° C. | 3600 | 52000 | 49000 | 13900 | 6100 | 7800 |

TABLE 4

| Preparation No. | 47 | 48 | 49 | 50 | 51 | 52 | 53 | 54 | 55 |
|---|---|---|---|---|---|---|---|---|---|
| Kind of Polyol | A + B | A + B | B | B | B | B | B | B | D |
| Raw Materials, parts Polyol A | 150 | 150 | — | — | — | — | — | — | — |
| Polyol B | 350 | 350 | 500 | 500 | 500 | 500 | 500 | 500 | — |
| Polyol D | — | — | — | — | — | — | — | — | 500 |
| HEA | 100 | — | — | — | — | 150 | — | — | 100 |
| HPA | — | 100 | — | — | — | — | — | — | — |
| HPMA | — | — | 100 | — | 150 | — | 100 | 100 | — |
| DPMA | — | — | — | 50 | — | — | — | — | — |
| GA | — | — | — | — | — | — | — | 200 | — |
| GMA | 200 | 200 | 200 | 100 | 100 | 100 | 150 | — | 250 |
| AN | 210 | 210 | 210 | 360 | 260 | 260 | 210 | 210 | 100 |
| MMA | — | — | — | — | — | — | 50 | — | 50 |
| AIBN | 4 + 1.6 | 4 + 1.6 | 4 + 1.6 | 8 + 1.6 | 4 + 1.6 | 4 + 1.6 | 4 + 1.6 | 4 + 1.6 | 4 + 1.6 |
| Xylene | 150 | 150 | 150 | 150 | 150 | 150 | 150 | 150 | 150 |
| Dispersion state | Stable | Stable | Stable | Stable | Stable | Stable | Stable | Stable | Stable |
| Appearance | Yellow brown | Yellow brown | Yellow brown | Yellow brown | Yellow brown | Yellow brown | Yellow brown | Yellow brown | Pale yellow |
| Polymer-content, % | 50.0 | 50.0 | 50.2 | 50.0 | 50.1 | 50.1 | 50.0 | 50.1 | 49.8 |
| OH—value, mg KOH/g | 62.4 | 57.2 | 52.9 | 27.9 | 78.7 | 86.5 | 53.0 | 52.9 | 66.4 |
| Viscosity, cps/25° C. | 36,100 | 34,200 | 13,200 | 75,300 | 49,500 | 29,000 | 14,700 | 19,600 | 14,800 |

EXAMPLES 1 TO 18, AND COMPARATIVE EXAMPLES 1 TO 2

According to the formulations written in Table 5, polyurethane elastomer molded articles were produced by mixing the raw materials vigorously for 10 seconds and pouring into an iron mold [127 mm × 100 mm × 12.7 mm (thickness)] preheated to a temperature of about 70° C., followed by demolding after 5 minutes and further annealing for 2 hours at 120° C. and then for additional 5 hours at 135° C.

Properties of the molded articles were as shown in Table 5.

In Table 5 and hereinafter Polymer polyols Nos. 1 to 57 represent the polymer polyols produced according to Preparations 1 to 57, respectively.

EXAMPLES 19 AND 20

According to the formulations below, RIM urethanes were produced under the following molding conditions using a R-RIM machine [Krauss-Maffei PU 40/40] by injecting into a mold [1000 mm×1000 mm×2.5 mm (thickness)], followed by annealing for 2 hours at 120° C. and then for additional 5 hours at 150° C.

Molding conditions:
- Material temperature: 40°–50° C.
- Mold temperature: 70° C.
- Injection pressure: 150 Kg/cm²G
- Injection time: 4.5 sec.
- Demold time: 30 sec.

Formulations and properties of the resulting RIM urethanes were as follows:

|  | Example 19 | Example 20 |
|---|---|---|
| Formulation | | |
| A-component | | |
| Polymer polyol 1, parts | 90 | 90 |
| Black toner, parts | 10 | 10 |
| EG, parts | 15 | 30 |
| DABCO33LV, parts | 0.5 | 0.5 |
| DBTDL, parts | 0.02 | 0.02 |
| B-component | | |
| Milionate MTL, parts | 76.6 | 148 |
| (NCOindex) | (90) | (95) |
| Freon-11, parts | 3 | 3 |
| Properties | | |
| Specific gravity | 1.20 | 1.21 |
| Tensile strength | 389 | 540 |
| Elongation | 70 | 14 |
| Flexural strength | 465 | 676 |
| Flexural modulus | 13400 | 18500 |
| Impact strength | 23 | 31 |
| Low temperature impact strength | 16 | 12 |
| Heat distortion temperature | 85 | 101 |

EXAMPLES 21 TO 44

Polyurethane molded articles were produced by the same manner as in Example 1.

Formulations and properties were as shown in Table 6. In Examples 21 and 29, ZnCl₂ was added as solution in EG.

EXAMPLES 45 TO 49

According to the formulations written in Table 7, RIM urethanes were produced under the following molding conditions using a R-RIM machine [MINIRIM MC-102, sold by Polyurethane Engineering Co., Ltd.] by injecting into a mold [400 mm×300 mm×3 mm (thickness)] preheated to a temperature of about 70° C., followed by demolding after 60 seconds, while the material tunks were maintained under reduced pressure continuously or intermittently in order to eliminate air or the like in the raw materials. RIM urethanes thus obtained were annealed for an hour at 120° C. and then for additional 5 hours at 130° C.

Properties of the molded articles were as shown in Table 7.

EXAMPLES 50 TO 55

Polyurethane molded articles were produced by the same manner as in Example 1.

Formulations and properties were as shown in Table 8. In Example 50, LiCl was added as solution in EG.

EXAMPLES 56 TO 61

Polyurethane molded articles were produced by the same manner as in Example 45.

Formulations and properties were as shown in Table 9.

In Tables 6 to 9, NCO Index means:

$$\frac{NCO\text{-}Eq}{AH\text{-}Eq + EP\text{-}Eq} \times 100,$$

wherein NCO-Eq represents NCO equivalent, AH-Eq represents equivalent of active hydrogen atom-containing group and EP-Eq represents equivarent of epoxy group.

In these examples, properties of polyurethanes were measured according to the following methods:
(1) Tensile strength, Kg/cm²: JIS K-6301
(2) Elongation, %: JIS K-6301
(3) Flexural strength, Kg/cm²: JIS K-7203
(4) Flexural modulus, Kg/cm²: JIS K-7203
(5) Impact strength, Kg/cm²: JIS K-7110
(6) Heat distortion temperature, °C.: JIS K-7207 (Method A)

TABLE 5

| Example No. | 1 | 2 | 3 | 4 | 5 | 6 | 7 | 8 | 9 | 10 |
|---|---|---|---|---|---|---|---|---|---|---|
| Polymer Polyol No. | 1 | 1 | 2 | 2 | 6 | 7 | 9 | 8 | 21 | 21 |
| Formulation, parts | | | | | | | | | | |
| Polymer Polyol | 100 | 100 | 100 | 100 | 100 | 100 | 100 | 100 | 100 | 100 |
| EG | 15 | 25 | 15 | 25 | 15 | 25 | 30 | 30 | 25 | 30 |
| DBTDL | 0.05 | 0.05 | 0.05 | 0.05 | 0.05 | 0.05 | 0.05 | 0.05 | 0.05 | 0.05 |
| Millionate MTL | 76.6 | 126.6 | 70.6 | 126.3 | 77.0 | 123.3 | 155 | 148 | 125 | 147 |
| (NCO Index) | (90) | (95) | (100) | (100) | (100) | (100) | (90) | (95) | (95) | (95) |
| Properties of Polyurethane | | | | | | | | | | |
| Specific Gravity | 1.19 | 1.18 | 1.19 | 1.18 | 1.16 | 1.17 | 1.18 | 1.15 | 1.16 | 1.17 |
| Flexural Strength | 405 | 591 | 343 | 535 | 323 | 330 | 576 | 586 | 512 | 619 |
| Flexural Modulus | 9560 | 14600 | 8860 | 12800 | 7730 | 8300 | 14700 | 13100 | 12800 | 15000 |
| Impact Strength at 23° C. | 42 | 19 | 16 | 16 | 23 | 34 | 13 | 28 | 23 | 46 |
| Impact Strength at −30° C. | 33 | 12 | 15 | 15 | 14 | 22 | 11 | 25 | 13 | 23 |
| Heat Distortion Temp. | 78 | 101 | 75 | 97 | 74 | 76 | 95 | 100 | 100 | 106 |

| | Example | | | | | | | Comparative | |
|---|---|---|---|---|---|---|---|---|---|
| Example No. | 11 | 12 | 13 | 14 | 15 | 16 | 17 | 18 | 1 | 2 |
| Polymer Polyol No. | 34 | 36 | 38 | 40 | 42 | 44 | 45 | 57 | I | II |
| Formulation, parts | | | | | | | | | | |
| Polymer Polyol | 100 | 100 | 100 | 100 | 100 | 100 | 100 | 100 | 100 | 100 |
| EG | 30 | 30 | 20 | 30 | 25 | 25 | 25 | 20 | 15 | 25 |

TABLE 5-continued

| | | | | | | | | | | |
|---|---|---|---|---|---|---|---|---|---|---|
| DBTDL | 0.05 | 0.05 | 0.05 | 0.05 | 0.05 | 0.05 | 0.05 | 0.05 | 0.05 | 0.07 |
| Millionate MTL | 152 | 161 | 111 | 160 | 129 | 131 | 148 | 128 | 80.2 | 130 |
| (NCO Index) | (95) | (95) | (95) | (90) | (95) | (95) | (90) | (95) | (105) | (105) |
| Properties of Polyurethane | | | | | | | | | | |
| Specific Gravity | 1.15 | 1.12 | 1.16 | 1.14 | 1.10 | 1.17 | 1.17 | 1.16 | 1.16 | 1.14 |
| Flexural Strength | 570 | 641 | 630 | 777 | 712 | 675 | 688 | 860 | 140 | 258 |
| Flexural Modulus | 14100 | 14900 | 15300 | 16800 | 15800 | 14400 | 15100 | 18000 | 2800 | 5950 |
| Impact at 23° C. | 11 | 16 | 14 | 11 | 18 | 12 | 18 | 10 | 41 | 15 |
| Strength at −30° C. | 6.1 | 12 | 10 | 6.5 | 15 | 10 | 13 | 7.3 | 9.7 | 6.1 |
| Heat Distortion Temp. | 123 | 124 | 100 | 112 | 116 | 106 | 110 | 137 | 48 | 69 |

TABLE 6

| Example No. | 21 | 22 | 23 | 24 | 25 | 26 | 27 | 28 | 29 | 30 | 31 | 32 |
|---|---|---|---|---|---|---|---|---|---|---|---|---|
| Polymer Polyol No. | 16 | 12 | 18 | 19 | 15 | 15 | 13 | 10 | 11 | 20 | 35 | 37 |
| Formulation, parts | | | | | | | | | | | | |
| Polymer Polyol | 100 | 100 | 100 | 100 | 100 | 100 | 100 | 100 | 100 | 100 | 100 | 100 |
| EG | 15 | 40 | 20 | 30 | 30 | 40 | 30 | 40 | 15 | 25 | 30 | 20 |
| DBTDL | 0.04 | 0.01 | 0.02 | 0.015 | 0.01 | 0.01 | 0.02 | 0.01 | 0.02 | 0.015 | 0.01 | 0.02 |
| NMM | — | 1.0 | 1.0 | 1.0 | 1.0 | 1.0 | 1.0 | 1.0 | — | 1.0 | 1.0 | 1.0 |
| ZnCl$_2$ | 1.0 | — | — | — | — | — | — | — | 1.0 | — | — | — |
| Millionate MTL | 86.5 + 10.3 | 188 + 10.3 | 103 + 15.4 | 148 + 20.5 | 148 + 5.7 | 193 + 5.7 | 154 | 201 | 101 | 136 | 168 | 131 |
| (NCO Index) | (95) | (95) | (96) | (96) | (95) | (95) | (95) | (95) | (95) | (95) | (95) | (90) |
| Properties of Polyurethane | | | | | | | | | | | | |
| Specific Gravity | 1.19 | 1.05 | 1.20 | 1.15 | 1.16 | 1.06 | 1.13 | 1.05 | 1.19 | 1.18 | 1.15 | 1.16 |
| Flexural Strength | 513 | 704 | 634 | 700 | 679 | 698 | 622 | 664 | 516 | 682 | 701 | 586 |
| Flexural Modulus | 12,100 | 16,900 | 15,000 | 17,000 | 15,800 | 17,100 | 15,900 | 14,100 | 12,400 | 16,000 | 16,200 | 13,900 |
| Impact at 23° C. | 14 | 22 | 12 | 13 | 20 | 23 | 19 | 23 | 14 | 15 | 12 | 11 |
| Strength at −30° C. | 11 | 17 | 10 | 12 | 17 | 18 | 16 | 17 | 10 | 13 | 10 | 10 |
| Heat Distortion Temp. | 102 | 118 | 115 | 123 | 105 | 112 | 107 | 112 | 100 | 114 | 140 | 119 |
| Example No. | 33 | 34 | 35 | 36 | 37 | 38 | 39 | 40 | 41 | 42 | 43 | 44 |
| Polymer Polyol No. | 39 | 41 | 43 | 46 | 47 | 48 | 49 | 50 | 51 | 52 | 53 | 54 |
| Formulation, parts | | | | | | | | | | | | |
| Polymer Polyol | 100 | 100 | 100 | 100 | 100 | 100 | 100 | 100 | 100 | 100 | 100 | 100 |
| EG | 20 | 30 | 15 | 30 | 25 | 30 | 30 | 30 | 25 | 25 | 30 | 20 |
| DBTDL | 0.02 | 0.02 | 0.02 | 0.02 | 0.015 | 0.015 | 0.015 | 0.01 | 0.01 | 0.01 | 0.01 | 0.01 |
| NMM | 1.0 | 1.0 | 1.0 | 1.0 | 1.0 | 1.2 | 1.2 | 1.2 | 1.0 | 1.0 | 1.2 | 1.0 |
| ZnCl$_2$ | — | — | — | — | — | — | — | — | — | — | — | — |
| Millionate MTL | 136 | 184 | 95.6 | 189 | 127 + 20.5 | 148 + 20.5 | 147 + 20.5 | 141 + 10.3 | 131 + 10.3 | 133 + 10.3 | 147 + 15.4 | 102 + 22.8 |
| (NCO Index) | (95) | (90) | (90) | (90) | (95) | (95) | (96) | (95) | (95) | (95) | (95) | (96) |
| Properties of Polyurethane | | | | | | | | | | | | |
| Specific Gravity | 1.14 | 0.96 | 1.08 | 0.95 | 1.12 | 1.04 | 1.10 | 1.14 | 1.16 | 1.15 | 1.11 | 1.19 |
| Flexural Strength | 681 | 655 | 522 | 540 | 672 | 640 | 630 | 600 | 691 | 623 | 637 | 540 |
| Flexural Modulus | 15,700 | 14,900 | 13,100 | 15,300 | 14,300 | 13,900 | 14,200 | 13,800 | 16,300 | 15,800 | 14,800 | 12,100 |
| Impact at 23° C. | 12 | 14 | 12 | 16 | 10 | 12 | 11 | 17 | 12 | 14 | 14 | 11 |
| Strength at −30° C. | 7.3 | 10 | 8.6 | 11 | 10 | 10 | 10 | 13 | 10 | 12 | 11 | 10 |
| Heat Distortion Temp. | 120 | 112 | 118 | 115 | 118 | 119 | 121 | 103 | 114 | 111 | 110 | 115 |

TABLE 7

| | | 45 | 46 | 47 | 48 | 49 |
|---|---|---|---|---|---|---|
| Example No. | | 45 | 46 | 47 | 48 | 49 |
| Polymer Polyol No. | | 20 | 20 | 49 | 49 | 49 |
| Formulation, parts | | | | | | |
| Component A | Polymer Polyol | 100 | 100 | 100 | 100 | 100 |
| | EG | 25 | 30 | — | — | — |
| | DETDA | — | — | 30 | 40 | 50 |
| | NMM | 1.0 | 1.0 | 1.0 | 1.0 | 1.0 |
| | DBTDL | 0.15 | 0.15 | 0.03 | 0.02 | 0.02 |
| Component B | Millionate MTL | 126 + 10.3 | 148 + 10.3 | 63.1 + 20.5 | 79.8 + 20.5 | 96.4 + 20.5 |
| | (NCO Index) | (95) | (95) | (99) | (99) | (99) |
| Properties of Polyurethane | | | | | | |
| Specific Gravity | | 1.18 | 1.21 | 1.21 | 1.20 | 1.18 |
| Flexural Strength | | 682 | 722 | 572 | 673 | 710 |
| Flexural Modulus | | 16,000 | 18,300 | 12,800 | 14,900 | 16,400 |
| Impact at 23° C. | | 15 | 17 | 16 | 17 | 13 |
| Strength at −30° C. | | 13 | 16 | 15 | 14 | 10 |
| Heat Distortion Temperature | | 114 | 118 | 115 | 123 | 135 |

TABLE 8

| Example No. | 50 | 51 | 52 | 53 | 54 | 55 |
|---|---|---|---|---|---|---|
| Polymer Polyol [A] No. | 22 | 27 | 25 | 24 | 23 | 26 |
| Polymer Polyol [B] No. | 28 | 31 | 32 | 29 | 33 | 30 |
| Formulation, parts | | | | | | |
| Polymer Polyol [A] | 70 | 60 | 40 | 15 | 40 | 75 |
| Polymer Polyol [B] | 30 | 40 | 60 | 85 | 60 | 25 |
| EG | 15 | 40 | 20 | 30 | 30 | 40 |
| DBTDL | 0.04 | 0.015 | 0.025 | 0.02 | 0.01 | 0.01 |
| NMM | 0 | 1.0 | 1.0 | 1.0 | 1.0 | 1.0 |
| LiCl | 1.0 | 0 | 0 | 0 | 0 | 0 |
| Millionate MTL | 83.2 + 8.2 | 200 + 10.3 | 95.2 + 9.2 | 142 + 17.5 | 148 + 21.6 | 193 + 10.8 |
| (NCO Index) | (96) | (95) | (95) | (95) | (95) | (95) |
| Properties of Polyurethane | | | | | | |
| Specific Gravity | 1.17 | 1.06 | 1.19 | 1.17 | 1.15 | 1.07 |
| Flexural Strength | 521 | 700 | 611 | 673 | 682 | 687 |
| Flexural Modulus | 12,900 | 16,300 | 14,700 | 16,600 | 16,100 | 16,800 |
| Impact Strength at 23° C. | 13 | 17 | 12 | 16 | 22 | 17 |
| Impact Strength at −30° C. | 10 | 14 | 11 | 12 | 15 | 12 |
| Heat Distortion Temp. | 100 | 114 | 106 | 115 | 107 | 110 |

TABLE 9

| | Example | | | | Comparative | |
|---|---|---|---|---|---|---|
| Example No. | 56 | 57 | 58 | 59 | 3 | 4 |
| Polymer Polyol [A] No. | 22 | 22 | 9 | 9 | — | — |
| Polymer Polyol [B] No. | 33 | 33 | — | — | 29 | 29 |
| Formulation, parts | | | | | | |
| Component A  Polymer Polyol [A] | 70 | 70 | 100 | 100 | — | — |
| Polymer Polyol [B] | 30 | 30 | — | — | 100 | 100 |
| EG | 25 | 30 | 25 | 30 | 25 | 30 |
| NMM | 1.0 | 1.0 | 1.0 | 1.0 | 1.0 | 1.0 |
| DBTDL | 0.15 | 0.15 | 0.15 | 0.15 | 0.15 | 0.15 |
| Component B  Millionate MTL | 126 + 10.8 | 149 + 10.8 | 129 | 155 | 127 + 20.5 | 152 + 20.5 |
| (NCO Index) | (95) | (96) | (90) | (90) | (104) | (105) |
| Properties of polyurethanes | | | | | | |
| Specific Gravity | 1.16 | 1.19 | 1.16 | 1.20 | 1.12 | 1.15 |
| Flexural Strength | 677 | 716 | 564 | 588 | 695 | 726 |
| Flexural Modulus | 15,600 | 17,700 | 14,200 | 15,100 | 16,200 | 18,600 |
| Impact Strength at 23° C. | 15 | 16 | 12 | 12 | 7.1 | 6.5 |
| Impact Strength at −30° C. | 12 | 13 | 10 | 10 | 6.6 | 6.2 |
| Heat Distortion Temperature | 115 | 117 | 91 | 96 | 123 | 127 |

What is claimed as new and desired to be secured by Letters Patent is:

1. A process for producing a cellular or noncellular polyurethane having improved rigidity and heat resistance, which comprises reacting at least one organic polyisocyanate with a polyol component, at least a part of the polyol component being a pendant hydroxyl radical-containing polymer polyol having a polymer content of at least 30% by weight, said polymer polyol being derived from at least one polyol having an equivalent weight of 200–4,000 and unsaturated monomers, the polymer portion of said polymer polyol comprisng monomer units of
    (a) 5–90% of at least one hydroxyl radical-containing monomer, selected from the group consisting of
        (1) esters of an ethylenically unsaturated carboxylic acid with a glycol,
        (2) polymerizable unsaturated aliphatic alcohols,
        (3) furfuryl alcohol, and
        (4) N-alkylol acrylamides;
    (b) 5–90% of at least one unsaturated nitrile;
    (c) 0–60% of at least one epoxy radical-containing monomer; and
    (d) 0–60% of at least one other monomer, based on the total weight of monomers, wherein the total amount of said epoxy radical-containing monomer and said other monomer is 0–60%.

2. The process of claim 1, wherein said hydroxyl radical-containing monomer is at least one ester selected from the group consisting of
    (1-i) esters of at least one ethylenically unsaturated carboxylic acid selected from the group consisting of acrylic, methacrylic, crotonic, maleic, fumaric, itaconic, citraconic, mesaconic, methylenemalonic, aconitic, cinnamic and vinyl benzoic acids, with at least one glycol selected from $C_2$–$C_6$ alkylene glycols and polyglycols, and
    (1-ii) mixed esters of at least one ethylenically unsaturated carboxylic acid selected from the group consisting of acrylic, methacrylic, crotonic, maleic, fumaric, itaconic, citraconic, mesaconic, methylenemalonic, aconitic, cinnamic and vinyl benzoic acids, with at least one glycol selected from the group consisting of $C_2$–$C_6$ alkylene glycols and polyglycols, and at least one mono-ol selected from the group consisting of $C_1$–$C_{20}$ monohydric alcohols and alkylene oxide adducts thereof containing generally 1–20 oxyalkylene units per mole.

3. The process of claim 2, wherein said carboxylic acid is selected from the group consisting of acrylic and methacrylic acids.

4. The process of claim 1, wherein said hydroxyl-containing monomer is selected from the group consisting of hydroxyethyl acrylate, hydroxypropyl acrylate, hydroxyethyl methacrylate, and hydroxypropyl methacrylate.

5. The process of claim 1, wherein said hydroxyl-containing monomer is of the formula (I):

$$CH_2=CR-COO(A-O)_nH \qquad (I)$$

wherein R is H or methyl; A is ethylene or propylene, or combination thereof; and n is an integer of 2-20.

6. The process of claim 1, wherein said unsaturated aliphatic alcohol is selected from the group consisting of vinyl alcohol, allyl alcohol, methallyl alcohol, crotyl alcohol, isocrotyl alcohol, butene mono-ols, butuene diols; propargyl alcohol, and alkylene oxide adducts of these alcohols containing 1-20 oxyalkylene units per mole.

7. The process of claim 1, wherein units of said hydroxyl-containing monomer are formed by polymerization of a precursor therefor containing a hydroxyl radical-forming group to obtain a polymer polyol containing hydroxyl radical-forming groups, followed by converting the hydroxyl radical-forming groups into hydroxyl radicals.

8. The process of claim 7, wherein said precursor is at least one member selected from the group consisting of esters of said unsaturated aliphatic alcohols with $C_1$-$C_{20}$ fatty acids.

9. The process of claim 1, wherein said nitrile is selected from the group consisting of acrylonitrile and methacrylonitrile.

10. The process of claim 1, wherein said epoxy-containing monomer is at least one compound selected from the group consisting of unsaturated hydrocarbon oxides, and unsaturated ethers, esters, urethanes, amides or acetals, which contain one or more epoxy radicals selected from the group consisting of 1,2-, 1,3-, 1,4- and 1,5-epoxide radicals.

11. The process of claim 1, wherein said epoxy-containing monomer is at least one compound selected from the group consisting of glycidyl acrylates and glycidyl methacrylate.

12. The process of claim 1, wherein said other monomer is selected from the group consisting of unsaturated hydrocarbon monomers, substituted styrenes, acrylic and substituted acrylic monomers, vinyl esters, vinyl ethers, vinyl ketones, other substituted vinyl monomers, unsaturated dicarboxylic acid and esters thereof.

13. The process of claim 1, wherein said monomer units comprise 10-80% of said hydroxyl radical-containing monomer, 10-80% of said unsaturated nitrile, and 0-60% of said epoxy radical-containing monomer plus said other monomer, based on the total weight of monomers.

14. A process for producing a cellular or noncellular polyurethane having improved rigidity and heat resistance, which comprises
reacting at least one organic polyisocyanate with a polyol component,
at least a part of the polyol component being a pendant hydroxyl radical-containing polymer polyol having a polymer content of 10-70% by weight,
said polymer polyol being derived from at least one polyol having an equivalent weight of 200-4,000 and unsaturated monomers,
the polymer portion of said polymer polyol comprising monomer units of
(a) 5-90% of at least one hydroxyl radical-containing monomer, selected from the group consisting of
  (1) esters of an ethylenically unsaturated carboxylic acid with a glycol,
  (2) polymerizable unsaturated aliphatic alcohols,
  (3) furfuryl alcohol, and
  (4) N-alkylol acrylamides;
(b) 5-90% of at least one unsaturated nitrile;
(c) 5-90% of at least one epoxy radical-containing monomer; and
(d) 0-60% of at least one other monomer, based on the total weight of monomers; and bringing about ring-opening reaction of epoxy radicals of said epoxy radical-containing monomer units of said polymer polyol, in the presence of an epoxy curing agent, simultaneously with, before or after the urethane-forming reaction.

15. A process for producing a cellular or noncellular polyurethane having improved rigidity and heat resistance, which comprises
reacting at least one organic polyisocyanate with a polyol component,
at least a part of the polyol component being
[A] 10-90% by weight of a pendant hydroxyl radical-containing polymer polyol having a polymer content of 10-70% by weight, said polymer polyol being derived from at least one polyol having an equivalent weight of 200-4,000 and unsaturated monomers,
the polymer portion of said polymer polyol comprising monomer units of
(a) 5-95% of at least one hydroxyl radical-containing monomer, selected from the group consisting of
  (1) esters of an ethylenically unsaturated carboxylic acid with a glycol,
  (2) polymerizable unsaturated aliphatic alcohols,
  (3) furfuryl alcohol and
  (4) N-alkylol acrylamides,
(b) 5-95% of at least one unsaturated nitrile, and
(d) 0-60% of at least one other monomer, based on the total weight of monomers; and
[B] 10-90% by weight of an epoxy radical-containing polymer polyol having a polymer content of 10-70% by weight,
said polymer polyol being derived from at least one polyol having an equivalent weight of 200-4,000 and unsaturated monomers,
the polymer portion of said polymer polyol comprising monomer units of
(b) 5-95% of at least one unsaturated nitrile,
(c) 5-95% of at least one epoxy radical-containing monomer, and
(d) 0-60% of at least one other monomer, based on the total weight of monomers; and
bringing about ring-opening reaction of epoxy radicals of said epoxy radical-containing monomer units of said epoxy radical-containing polymer polyol [B], in the presence of an epoxy curing agent, simultaneously with, before or after the urethane-forming reaction.

16. The process of claim 1, wherein said polyol having an equivalent weight of 200-4,000 is at least one selected from the group consisting of polyether polyols, polyester polyols, urethane polyols and vinyl-modified polyols.

17. The process of claim 1, wherein the polyol component comprises at least 20% by weight of said polymer polyol and 0–80% of at least one other active hydrogen atom-containing compound selected from the group consisting of
  (i) high molecular weight polyols, having equivalent weight of 200–4,000, selected from the group consisting of polyether polyols, polyester polyols, urethane polyols and vinyl-modified polyols;
  (ii) high molecular weight polyamines, having equivalent weight of 200–4,000;
  (iii) low molecular weight active hydrogen atom-containing compounds selected from the group consisting of low molecular weight polyols and amines, having equivalent weight of at least 30 and less than 200; and
  (iv) combinations of two or more of them.

18. The process of claim 1, wherein the content of polymer moiety of said polymer polyol is 5–70% based on the weight of the whole active hydrogen atom-containing compounds.

19. The process of claim 1, wherein the polyurethane is produced in the presence of at least one additive selected from the group consisting of surfactants, flame retardants, retarders, colorants, internal mold release agents, age resistors, antioxidants, plasticizers, germicides and fillers.

20. The process of claim 1, wherein NCO index in the urethane-forming reaction is 65–120.

21. The process of claim 1, wherein NCO index in the urethane-forming reaction is 300–1,000 or more to produce isocyanurate rings in the polyurethane.

22. The process of claim 1, wherein said polyisocyanate is reacted with said polyol component by Reaction Injection Molding method, or by conditioning them to a temperature of 25°–90° C., intimately mixing said components under a pressure of 100–200 kg/cm²g, injecting said mixture into a mold preheated to a temperature 30°–120° C., and thereafter demolding the resulting article.

23. The process of claim 1, wherein the resulting product is after-cured at a temperature of 120°–140° C. for 1–30 hours.

24. A cellular or noncellular polyurethane, having a density of 0.01 to 1.4 g/cm³, obtained by the process of claim 1.

25. The polyurethane of claim 24, having a density of 0.8 to 1.4 g/cm³.

26. The polyurethane of claim 24, having a flexural modulus of at least 7,000 Kg/cm².

27. The polyurethane of claim 24, having a notched Izod impact strength of at least 10 Kgcm/cm at 23° C.

28. A crosslinked polyurethane, obtained by the process of claim 14.

29. A crosslinked polyurethane, obtained by the process of claim 15.

30. A process for producing a pendant hydroxyl radical-containing polymer polyol, which comprises polymerizing unsaturated monomers in situ in at least one polyol having an equivalent weight of 200–4,000, said monomers being used in an amount of 50–250 parts per 100 parts of said polyol, said monomers comprising
  (a) 5–90% of at least one hydroxyl radical-containing monomer or precursor thereof, selected from the group consisting of
    (1) esters of an ethylenically unsaturated carboxylic acid with a glycol,
    (2) polymerizable unsaturated aliphatic alcohols, or fatty acid esters thereof,
    (3) furfuryl alcohol, and
    (4) N-alkylol acrylamides;
  (b) 5–90% of at least one unsaturated nitrile;
  (c) 0–90% of at least one epoxy radical-containing monomer; and
  (d) 0–60% of at least one other monomer, based on the total weight of monomers.

31. The process of claim 30, which comprises polymerizing monomers containing a fatty acid ester of an unsaturated aliphatic alcohol to obtain a polymer polyol containing hydrolyzable ester groups, followed by converting at least a part of the ester groups of the resulting polymer polyol to hydroxyl radicals by hydrolysis or alcoholysis in the presence of a basic or acidic catalyst.

32. The process of claim 31, wherein the basic catalyst is at least one compound selected from the group consisting of cycloamidines and diazabicycloalkenes, having the general formula:

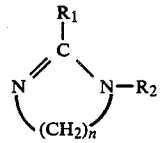

wherein $R_1$ is H or an alkyl group having 1–8 carbon atoms, $R_2$ is an alkyl group having 1–8 carbon atoms, or $R_1$ and $R_2$ may be joined to form a ring having 2–11 methylene groups, n is an integer of 2–6, and each of the methylene groups may carry a lower alkyl substituent.

33. The process of claim 32, wherein the compound is 1,8-diazabicyclo[5,4,0]-7-undecene.

34. A polymer polyol composition comprising the product of the in situ polymerization of said monomers in said polyol produced in accordance with the process of claim 30.

35. The process of claim 1, wherein said other monomers is at least one selected from the group consisting of styrene and methyl methacrylate.

36. The process of claim 1, wherein said reacting step is preformed in the presence of a blowing agent.

37. The process of claim 14, wherein said reacting step is performed in the presence of a blowing agent.

38. The process of claim 15, wherein said reacting step is performed in the presence of a blowing agent.

39. The process of claim 14, wherein said ring-opening reaction is performed with an epoxy curing accelerator.

40. The process of claim 15, wherein said ring-opening reaction is performed with an epoxy curing accelerator.

41. The composition of claim 34, having a polymer content of at least 40% by weight.

* * * * *